(12) United States Patent
Garg et al.

(10) Patent No.: US 7,434,257 B2
(45) Date of Patent: Oct. 7, 2008

(54) SYSTEM AND METHODS FOR PROVIDING DYNAMIC AUTHORIZATION IN A COMPUTER SYSTEM

(75) Inventors: Praerit Garg, Kirkland, WA (US); Robert P. Reichel, Sammamish, WA (US); Richard B. Ward, Redmond, WA (US); Kedarnath A. Dubhashi, Bellevue, WA (US); Jeffrey B. Hamblin, North Bend, WA (US); Anne C. Hopkins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 912 days.

(21) Appl. No.: 09/849,093

(22) Filed: May 4, 2001

(65) Prior Publication Data

US 2002/0002577 A1   Jan. 3, 2002

Related U.S. Application Data

(60) Provisional application No. 60/214,811, filed on Jun. 28, 2000.

(51) Int. Cl.
*G06F 21/00* (2006.01)
(52) U.S. Cl. .............................. 726/21; 726/4; 726/17; 709/229; 707/9
(58) Field of Classification Search ......... 713/182–183, 713/185, 200; 709/225, 229; 707/9; 726/4, 726/17, 21
See application file for complete search history.

(56) References Cited

U.S. PATENT DOCUMENTS

| 5,321,841 | A * | 6/1994 | East et al. ................... 718/107 |
| 6,308,273 | B1 * | 10/2001 | Goertzel et al. ............... 726/9 |
| 6,366,913 | B1 * | 4/2002 | Fitler et al. ...................... 707/9 |
| 6,412,070 | B1 * | 6/2002 | Van Dyke et al. ........... 713/200 |
| 6,591,265 | B1 * | 7/2003 | Erickson et al. ................. 707/9 |
| 6,754,829 | B1 * | 6/2004 | Butt et al. .................... 713/200 |
| 7,216,345 | B1 * | 5/2007 | Porter ......................... 718/100 |
| 2002/0010768 | A1 * | 1/2002 | Marks et al. ................. 709/223 |

OTHER PUBLICATIONS

Hadfield L., et al, "Window NT Server 4 Security Handbook", 1997, QUE Corporation, pp. 79-86, 225-236.*
Thomas, R. K. et al, "Task-based Authorization Controls (TBAC): A Family of Models for Active and Enterprise-oriented Authorization Management", 1997, Proceeding of the IFIPWG11.3 Workshop on Database Security.*

(Continued)

*Primary Examiner*—Gilberto Barron, Jr.
*Assistant Examiner*—Minh Dinh
(74) *Attorney, Agent, or Firm*—Woodcock Washburn LLP

(57) ABSTRACT

A dynamic authorization callback mechanism is provided that implements a dynamic authorization model. An application can thus implement virtually any authorization policy by utilizing dynamic data and flexible policy algorithms inherent in the dynamic authorization model. Dynamic data, such as client operation parameter values, client attributes stored in a time-varying or updateable data store, run-time or environmental factors such as time-of-day, and any other static or dynamic data that is managed or retrievable by the application may be evaluated in connection with access control decisions. Hence, applications may define and implement business rules that can be expressed in terms of run-time operations and dynamic data. An application thus has substantial flexibility in defining and implementing custom authorization policy, and at the same time provides standard definitions for such dynamic data and policy.

20 Claims, 9 Drawing Sheets

OTHER PUBLICATIONS

"Securing and Managing Web Resources with IBM SecureWay Policy Director—White Paper", IBM, Mar. 1999, Retrieved from the Internet on Jul. 13, 2006: <URL:http://www.-03.ibm.com/security/library/wp_policy-dir.shtml>.*

Kassab, L.L. et al., "Towards formalizing the Java security architecture of JDK 1.2," *Computer Security—ESORICS 98. 5th European Symposium on Research in Computer Security*, published by Springer-Verlag, Berlin, Germany, Quisquater, J-J. et al. (eds.), Louvain-la-Neuve, Belgium, Sep. 16-18, 1998, 191-207.

Sandhu, R.S. et al., "Some owner based schemes with dynamic groups in the schematic protection model," *Proceedings of the 1986 IEEE Symposium on Security and Privacy*, published by IEEE Computer Soc. Press, Oakland, CA, Apr. 7-9, 1986, 61-70.

Bai, Y. et al., "A language for specifying sequences of authorization transformations and its applications," *Information and Communications Security. First International Conference, ICIS '97*, published by Springer-Verlag, Berlin, Germany, Beijing, China, Nov. 11-14, 1997, 39-49.

Netegrity, "SiteMinder Delivers Industry-Leading Performance, Scalability, and Reliability," Netegrity White Paper, Dec. 1999, 5 pages.

* cited by examiner

FIG. 1 - Prior Art

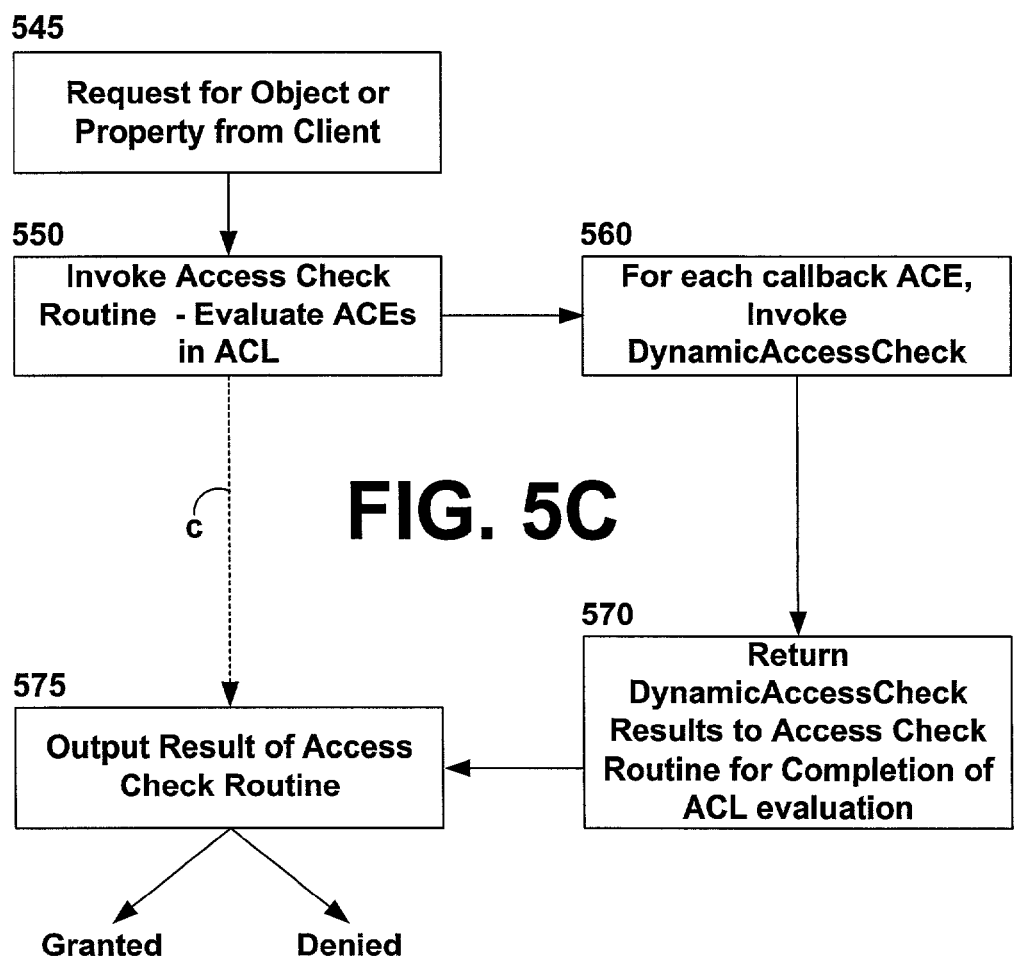

SYSTEM AND METHODS FOR PROVIDING DYNAMIC AUTHORIZATION IN A COMPUTER SYSTEM

CROSS REFERENCE TO RELATED APPLICATION

This application claims priority to U.S. Provisional Application Ser. No. 60/214,811, filed Jun. 28, 2000.

FIELD OF THE INVENTION

This invention relates generally to the provision of authorization policies in a computer system, and more particularly to standardizing methods for providing dynamic authorization to applications, objects and/or services in a computer system.

BACKGROUND OF THE INVENTION

Current mechanisms, including application programming interfaces (APIs) and Discretionary Access Control Lists (DACLs), for implementing an authorization policy for applications and services support a model of static authorization policy, which includes both static policy data and static policy evaluation algorithms. In a simple example, static data might include assigning a user an access level number from 1 to 5, and static evaluation algorithms might include an if-then-else structure wherein access is determined relative to the access level number assigned to a user. Static policy data and policy evaluation algorithms can be considerably more complex, but at the root of such static data and evaluation algorithms is that the policy data does not vary from one policy evaluation to the next (unless the data has been administratively reconfigured), and the evaluation algorithm enforced by the authorization mechanism does not vary, regardless of policy configuration, and does not take into account nonstatic policy data (i.e., data that varies from one evaluation to the next, barring administrative policy data changes).

For example, a conventional technique based upon a static authorization model is illustrated in FIG. 1. Pursuant to a request for access to some object or property, an Access Control List (ACL) evaluation routine is initiated at 300. At 310, 315 and 320, serial determinations are made pursuant to the ACL evaluation as to whether permission may be granted for the requested object or property. In this instance, access to a document is being requested. Thus, questions (each an evaluation of asserted policy data) such as whether the requester is an authorized manager 310, whether the requestor is an administrator 315 and whether the requester is a security personnel 320 are answered. The static policy evaluation algorithm is "if the requestor matches any of the asserted identities, then grant access at 325, otherwise deny access." To add or remove an authorization policy assertion, the underlying ACL is altered to contain an additional Access Control Entry (ACE) or to remove an ACE. Reflecting the static nature of the policy evaluation algorithm, it is not possible to change the way in which the series of policy assertions are evaluated. For example, it's not possible to assert that the requestor must match all (rather than any) of the identities in order to grant access. Nor is it possible to make a policy assertion (e.g., access granted only between the hours of 9 AM and 5 PM) that requires non-static data (e.g., the current time of day) for policy evaluation.

It is thus often desirable to grant access privileges to applications, services, and various objects based upon dynamic factors i.e., based upon factors that may change from one access evaluation to the next, even for the same requester. Within an organization, for example, people are promoted or given new privileges. For another example, the amount of an expense report may change over time. Similarly, the client context can change too if hardware and/or software on the machine is altered, which could happen, for instance, if an administrator or other machine in an associated computer system changes a characteristic of the client. Thus, the client and user data upon which access decisions are based can grow considerably more complex over time with the result being that the ability to define data and policy that can account for such potential change provides a great deal of flexibility to the developer. While custom code has been written for some applications that has provided access decision-making based upon dynamic factors and policies, custom code implies lack of transportability or cross-applicability.

Thus, it would be desirable to specify, according to standard APIs and DACLs, access data based upon dynamic factors, such as client attributes, client operation parameter values, and system environment variables for use in connection with an access policy. It would be further desirable to specify access policy according to dynamic factors, wherein unique formats and routines are provided for dynamically computing permission to use a requested object or to perform tasks.

SUMMARY OF THE INVENTION

The dynamic authorization callback mechanism of the invention provides access decision making based upon a dynamic authorization model. An application can thus implement virtually any authorization policy using authorization APIs and DACLs that support this invention, by utilizing dynamic data and flexible policy algorithms inherent in the dynamic authorization model. Dynamic data, such as client operation parameter values, client attributes stored in a time-varying or updateable data store, run-time or environmental factors such as time-of-day, and any other static or dynamic data that is managed or retrievable by the application may be evaluated in connection with access control decisions. Hence, applications may define and implement business rules that can be expressed in terms of run-time operations and dynamic data. Because this invention places no restrictions on the policy language, an application has substantial flexibility in the definition and implementation of custom authorization policy, while at the same time providing standard APIs and ACL definitions for such dynamic data and policy.

Other features of the present invention are described below.

BRIEF DESCRIPTION OF THE DRAWINGS

The system and methods for providing dynamic authorization in a computer system are further described with reference to the accompanying drawings in which:

FIG. 5C is a flow diagram illustrating an exemplary sequence of events in connection with the dynamic determination of whether access can be granted to a requested resource in accordance with the present invention.

DETAILED DESCRIPTION OF PREFERRED EMBODIMENTS

Overview

In consideration of the above need for dynamic data and dynamic expression of policy when granting access to applications, services and objects, the invention provides two primary objects or mechanisms for incorporating dynamic factors into access decisions: Dynamic Groups and Dynamic Access Check. Dynamic Groups enables an application to assign temporary group membership, based upon transient or changing factors, to a client for the purpose of checking access rights. Dynamic Access Check enables an application to perform customized procedures for checking access rights, also based upon transient or changing factors such as data from client operation parameters, authorization policy data stored in a specialized callback Access Control Entry (ACE) type designed for dynamic access check policies, and any other authorization policy data that may be managed, computed or retrieved by the application, service or object.

The specialized type of ACE has an identifier that indicates whether the Dynamic Access Check callback function should be invoked, and may contain authorization policy data in a format defined by the application. An application, service or object that uses the novel structures and modules in accordance with the present invention registers its use of Dynamic Access Check with an authorization service initialization API. Then, the Dynamic Access Check routine is invoked automatically by Access Check APIs when the underlying DACL evaluation routine identifies a match between an identifier in the client authorization context and the identifier for the specialized type of ACE in accordance with the present invention. In the case of such a match, the dynamic policy data from the specialized type of ACE is passed from an invoking Access check API through to the Dynamic Access Check routine.

In general, an initialization of the invention includes registering the application for Dynamic Access functionality. Afterwards, the invention includes the computation of the client context, which may involve invoking Dynamic Groups to determine the current authorization context of the access requestor (which may be a user or another machine). The authorization context may include, for example, privileges, attributes, group identifiers and the like. Next, a determination is made as to whether the requester is granted access to the functionality requested, in accordance with the existing Access Check APIs and the Dynamic Access Check mechanism described above, which may be based upon dynamic factors and may be application specific. Access for the functionality requested is then either granted or denied to the requester. In this fashion, policy based "business rules" for authorization to applications and services may be enforced dynamically. Advantageously, presently used static Access Check routines and APIs are not supplanted by the invention, but rather the invention may supplement their use.

Exemplary Computer and Network Environments

Figure 1:
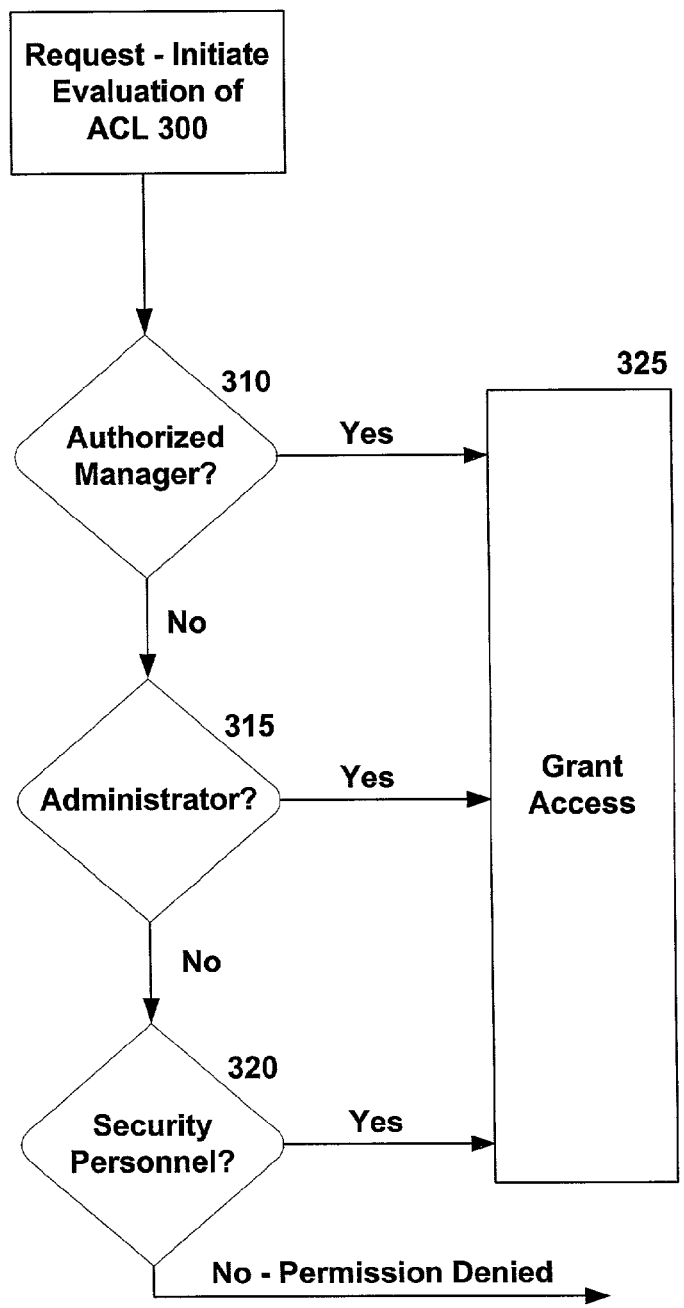
FIG. 1 is an exemplary prior art access decision making process demonstrating the rigidity with which such access decisions have conventionally been made.
Figure 2:
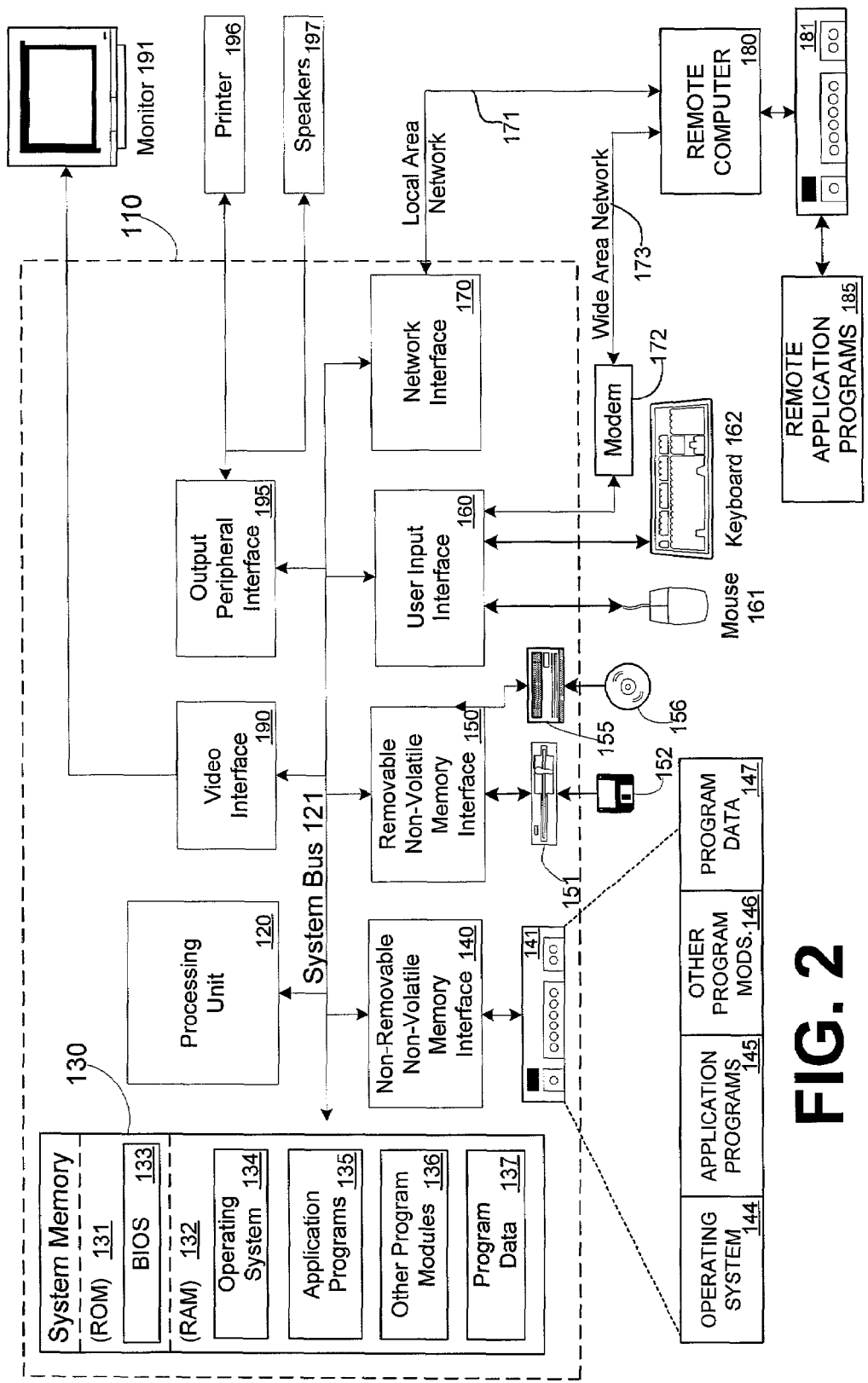
FIG. 2 is a block diagram representing a suitable computing system environment in which the present invention may be implemented.

FIG. 2 and the following discussion are intended to provide a brief general description of a suitable computing environment in which the invention may be implemented. Although not required, the invention will be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 2 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2 provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
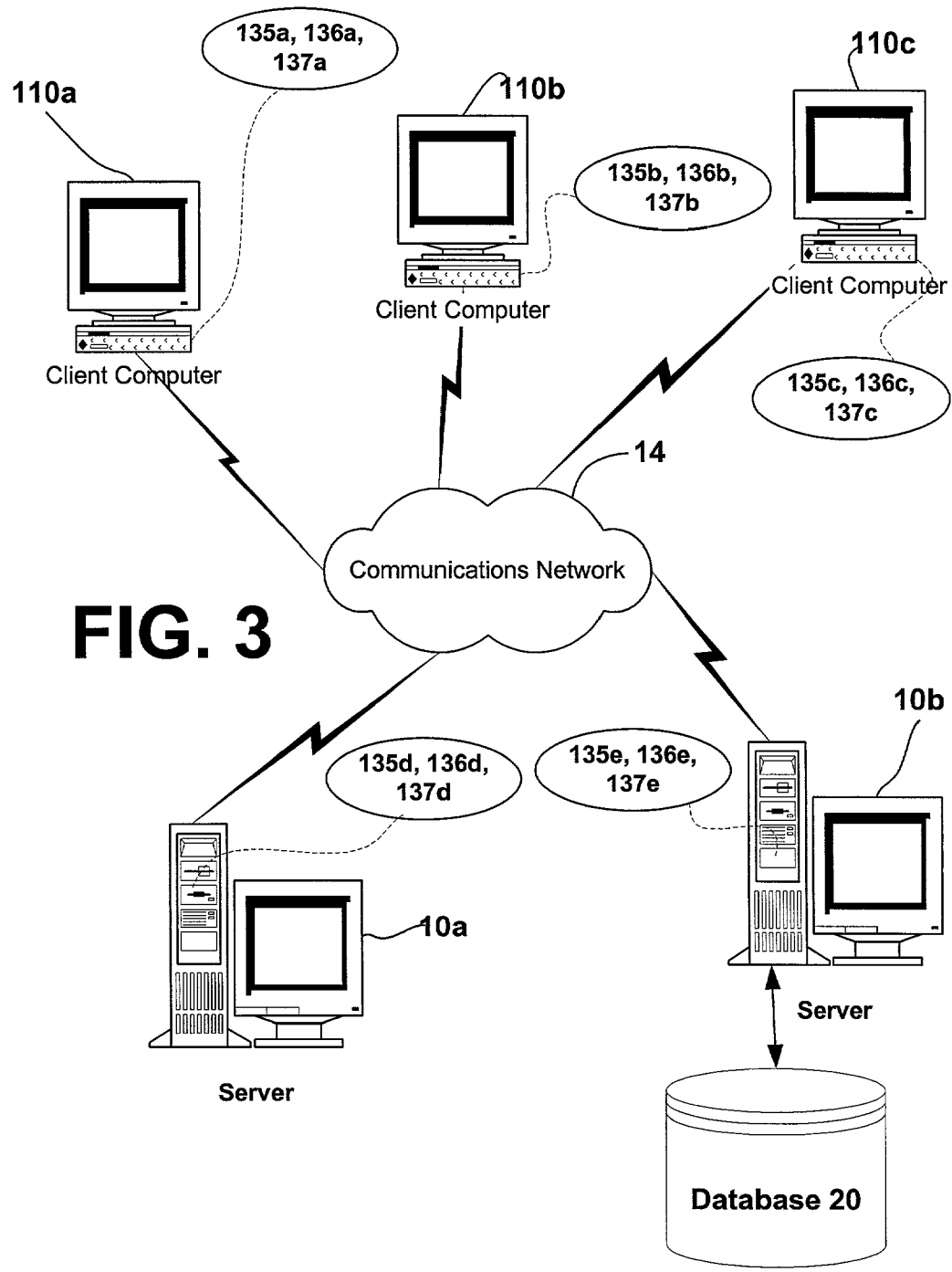
FIG. 3 is a block diagram representing an exemplary network environment in which the present invention may be implemented.

As mentioned, a computer 110, such as described above, can be deployed as part of a computer network. Further, the present invention pertains to any computer system having any number of memory or storage units, and any number of applications and processes occurring across any number of storage units or volumes. Thus, the present invention may apply to both server computers and client computers deployed in a network environment, having remote or local storage. FIG. 3 illustrates an exemplary network environment, with a server in communication with client computers via a network, in which the present invention may be employed. As shown, a number of servers 10a, 10b, etc., are interconnected via a communications network 14 (which may be a LAN, WAN, intranet or the Internet) with a number of client computers 110a, 110b, 110c, etc. In a network environment in which the communications network 14 is the Internet, for example, the servers 10 can be Web servers with which the clients 110a, 110b, etc. communicate via any of a number of known protocols such as hypertext transfer protocol (HTTP). Each client computer 110 and server computer 10 may be equipped with various application program modules 135, other program modules 136 and program data 137, and with connections or access to various types of storage elements or objects, across which files may be stored or to which portion(s) of files may be downloaded or migrated. Any server 10a, 10b, etc. may be responsible for the maintenance and updating of a database 20 in accordance with the present invention. Thus, the present invention can be utilized in a computer network environment having client computers 110a, 110b, etc. for accessing and interacting with a computer network and server computers 10a, 10b, etc. for interacting with client computers 110a, 10b, etc. and databases 20.

Dynamic Authorization Policies

The dynamic authorization callback mechanism of the present invention provides extensible support for application-defined business rules via a set of APIs and DACLs. As mentioned in the overview of the invention, the invention includes two elements: (1) Dynamic Groups, which enables an application to assign temporary group membership, based on dynamic or transient factors, to a client for the purpose of access check and (2) Dynamic Access Check, which enables an application to perform customized access checks using pre-existing DACLs and APIs.

Dynamic Groups includes a ComputeDynamicGroups callback mechanism, which may be used to augment a client's authorization context with application-defined dynamic group identifiers. This mechanism augments the client's context because placing additional group identifiers in a client's authorization context may affect a subsequent access control decision if the DACL being evaluated contains any of the additional group identifiers. As mentioned, the ComputeDynamicGroups callback mechanism is implemented to be application specific allowing the application to drive which groups are important for client context purposes, and allowing complete customization of dynamic group membership policy.

The invention includes a registration API, so that initially, an application may register its ComputeDynamicGroups function with the invention's authorization service initialization API. Once registered, the ComputeDynamicGroups callback function is invoked automatically by APIs that initialize a client authorization context from a system level authorization context or a user's security identifier (SID). Thus, for instance, when a user attempts to connect to an application using the invention, the ComputeDynamicGroups callback function, having been registered by the application, is invoked and the client context may then be augmented with relevant dynamically computed client contextual data.

Dynamic Access Check includes a DynamicAccessCheck callback mechanism, which performs an access check based upon application-specific or business rules that may incorporate the following kinds of dynamic data: data from client operation parameters, authorization policy data stored in a callback Access Control Entry (ACE), and any other authorization policy data managed, computed or retrieved by the application.

The callback ACE implemented in accordance with the invention supplements the use of standard or pre-existing DACLs to provide authorization policies based upon dynamic factors. A field or entry of an ACE identifies the ACE as a callback ACE. When a conventional authorization or access check mechanism, modified to incorporate application specific dynamic data as argument(s), is performed to compute an ACL having a list of ACEs, the DynamicAccessCheck mechanism is invoked if an ACE is encountered that is a callback ACE. Thus, the ACE field that identifies the ACE as a callback ACE also indicates that the DynamicAccessCheck callback function should be invoked, and that indicates to DynamicAccessCheck that the ACE may contain authorization policy data in a format defined by the application. Also, any relevant dynamic data passed into the conventional authorization check mechanism may be passed as an argument to the DynamicAccessCheck routine. Advantageously, DynamicAccessCheck is tailored to an application, whereby business rules may be defined in terms of the relevant dynamic data and existing static data, allowing complete customization of authorization policy predicated upon dynamic and static data.

An application registers its DynamicAccessCheck function with an authorization service initialization API before the application may make use of its customized business rules. After initialization, the DynamicAccessCheck callback function is invoked automatically by access check APIs when the underlying DACL evaluation routine identifies a match between an identifier in the client authorization context and a callback ACE structure defined in accordance with the present invention. Thus, as outlined above, policy data stored in the callback ACE and/or passed into the access check API by the application caller or client can be passed to the DynamicAccessCheck callback for evaluation.

The problem addressed by the dynamic authorization callback mechanism of the invention is the static nature or quality of standard authorization models. As related in the background section, standard authorization APIs and DACLs support a model of static authorization policy, which implies both static data and static policy algorithms. With static data, access to resources is controlled by configurable, but essentially static, policy data in the form of DACLs associated with a set of resources. It is not possible within this model to base an access control decision on run-time or transient factors such as client operation parameter values, client attributes other than standard operating system defined memberships, or run-time or enviromnental factors such as time-of-day. With static DACL policy algorithms, policy can be used to express, for a specified subject SID, a grant or deny of a permission set to a given object or property. This policy is extensible in only a limited sense, however, allowing new objects, properties and permissions to be defined only at the behest of a developer or application administrator between uses or while the application is off-line. Thus, the policy is not expressive enough to allow definition of rules pertaining to dynamic data, such as client operation parameters, client attributes (other than user or group identifiers), or run-time factors such as time-of-day.

The dynamic authorization callback mechanism of the invention provides a solution to this problem by supporting instead a dynamic authorization model that is layered on top of the static authorization model. An application can thus implement virtually any authorization policy using authorization APIs and DACLs that support this invention, by utilizing the dynamic data and flexible policy algorithms inherent in the model. With this invention, the following types of dynamic data may be evaluated to contribute to the access control decision: client operation parameter values, client attributes stored in Active Directory™ or any other type of data store, run-time or environmental factors such as time-of-day, any other static or dynamic data that is managed or retrievable by the application. Hence, applications may define and implement business rules that can be expressed in terms of operations upon dynamic data. Because this invention places no restrictions on the policy language, an application has complete flexibility in the definition and implementation of custom authorization policy.

As outlined above, the dynamic authorization callback mechanism supports dynamic data and flexible policy algorithms with the following mechanisms: dynamic data for dynamic group evaluation and dynamic data for dynamic access check evaluation.

In more detail, dynamic group evaluation has two methods for utilizing dynamic data during evaluation of a client's dynamic group assignments. First, there is application data input to ComputeDynamicGroups. In this regard, at the time a client connects to the system, the portion of the application responsible for access may provide an unrestricted block of data and pass that block of data into that client's authorization context initialization routines. This block of data can then be passed to the application-defined ComputeDynamicGroups callback, for evaluation by the application when determining which dynamic groups apply to that client. This block of data may, for example, contain the parameter values from the operation invoked by the client. Second, there is data retrieved or computed within the ComputeDynamicGroups callback itself. Within the ComputeDynamicGroups callback, an application may retrieve or compute the following kinds of data for use in determining a client's Dynamic Group set: client attributes, retrieved from a directory service or another store, using the client's user and group identities e.g., from the client authorization context, system or environment data, such as which connections are currently on-line, time-of-day, whether it is raining in Seattle, Washington, whether the moon is full, etc. In this regard, the present invention contemplates that such data may come from anywhere, without limitation.

In more detail, dynamic access check evaluation according to the invention allows applications two methods for utilizing dynamic data during access checks. First, application data may be input to DynamicAccessCheck from an application. At access check time, an application may provide an unrestricted block of data as a parameter to the standard access check routines. This data block is subsequently passed to the application-defined DynamicAccessCheck callback, if invoked as a result of the specialized callback ACE, for evaluation by the application when determining what access to grant to the client. This block of data may, for example, contain the parameter values from the operation invoked by the client. Second, dynamic data may be retrieved or computed within the DynamicAccessCheck callback routine. Within the DynamicAccessCheck callback, an application may retrieve or compute the following kinds of data for use in determining a client's access: client attributes, retrieved from a directory service or any other data store, using the client's user and group identities e.g., from the client authorization context, system or environment data, such as which connections are currently on-line, time-of-day, whether it is snowing in Vancouver, Canada, whether the moon is full, etc.

Advantageously, the DynamicAccessCheck mechanism provides flexible policy algorithms. Applications have two methods for defining custom authorization policy that are not restricted to expressiveness by any mandated policy language or model. First, as mentioned, a specialized callback ACE has been defined for use in connection with the ACL that includes data suited to this purpose. The callback ACE types include a field for optional data whose format and contents are specified by the application. This field may be used to contain authorization rules and data, expressed in any policy language the application defines, applicable to the object(s) associated with the DACL containing the Callback ACE. Second, applications may define custom authorization policy via tailored code for modules including dynamic group membership rules and access check rules, in the code that implements the ComputeDynamicGroups and DynamicAccessCheck callbacks, respectively, and/or a separate data store containing policy data used by the ComputeDynamicGroups and DynamicAccessCheck callbacks.

Figure 4:
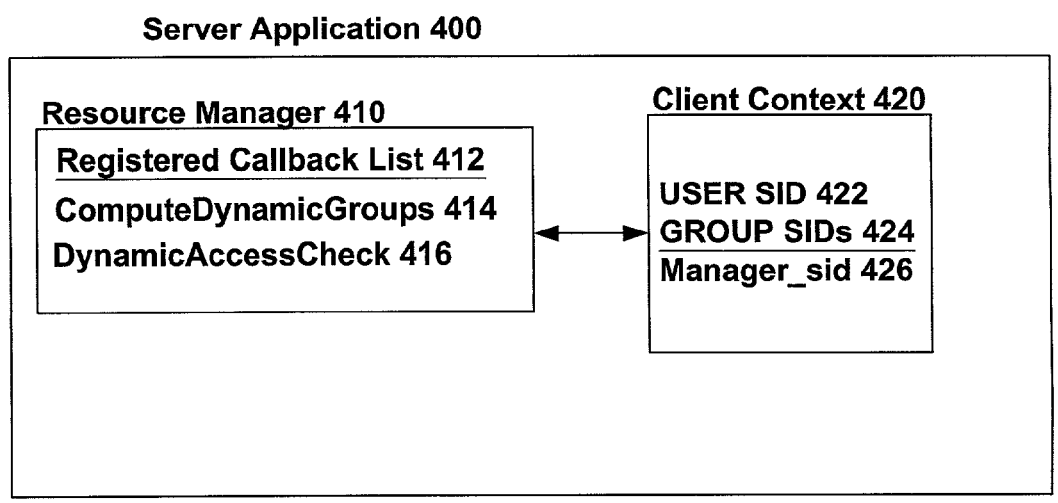
FIG. 4 is a block diagram of an exemplary architecture used in connection with the provision of dynamic authorization service in accordance with the present invention.

FIG. 4 illustrates an exemplary authorization framework in accordance with the present invention. In one embodiment, the authorization framework architecture of the invention includes two main components: (1) a resource manager 410 and (2) the computed client context 420.

A resource manager is a generic object that manages and controls resources in a computer system. The resource manager 410 stores references to application-defined callback functions, and creates a client context 420 for each incoming client to the application 400 i.e., it represents clients trying to access resource(s) managed by the resource manager 410. The references to application-defined callback functions are stored in a registered callback list 412. List 412 may, for example, contain stored references to the ComputeDynamicGroups 414 and DynamicAccessCheck 416 callbacks of the present invention.

The client context 420 contains the user identifier 422 and group identifiers 424, an example of which might be Manager_sid 426 associated with the client, and is used within access check functions to determine which DACL entries, that is, which ACEs, are applicable to the client making the request.

In an exemplary embodiment, the invention assumes an application model where the application 400 has a resource manager 410 that performs management functions for the application 400. For example, the resource manager 410 manages objects and resources that are protected by DACLs defined via ACEs. The resource manager 410 manages resources i.e., it controls the creation, storage, and manipulation of some object or resource type. The resource manager manages authorization information i.e., it controls the storage and manipulation of authorization information which defines the access policy for the managed resources that may be expressed in the form of DACL that may contain one or more callback ACEs. Advantageously, the invention may be implemented on top of or as a supplement to an existing authorization framework. For example, as described earlier, current ACL nomenclature may be updated to define a new callback ACE type for defining flexible policy based upon dynamic factors.

Figure 5A:
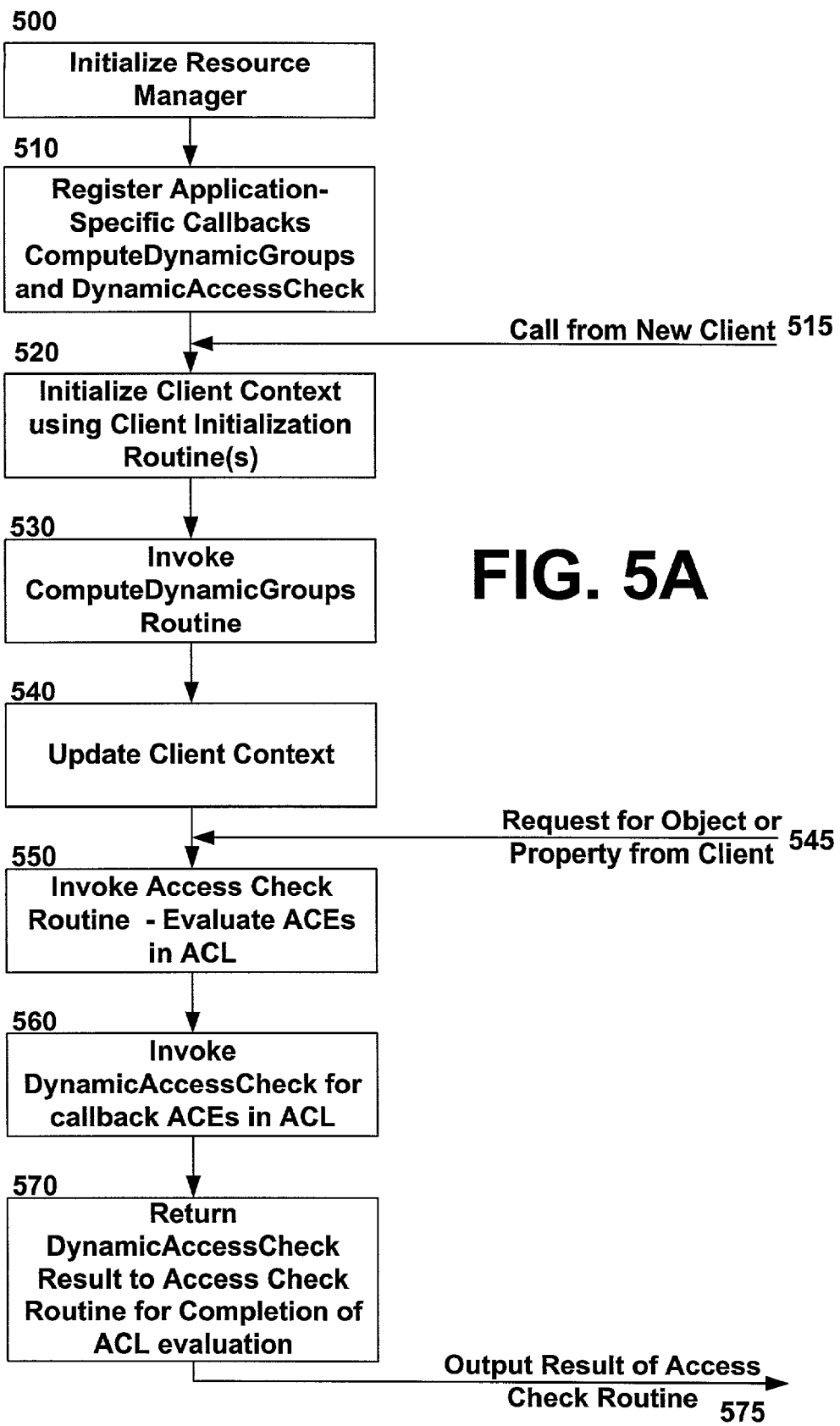
FIG. 5A is a flow diagram illustrating an exemplary sequence of events in connection with the provision of dynamic authorization service in accordance with the present invention.
Figure 5B:
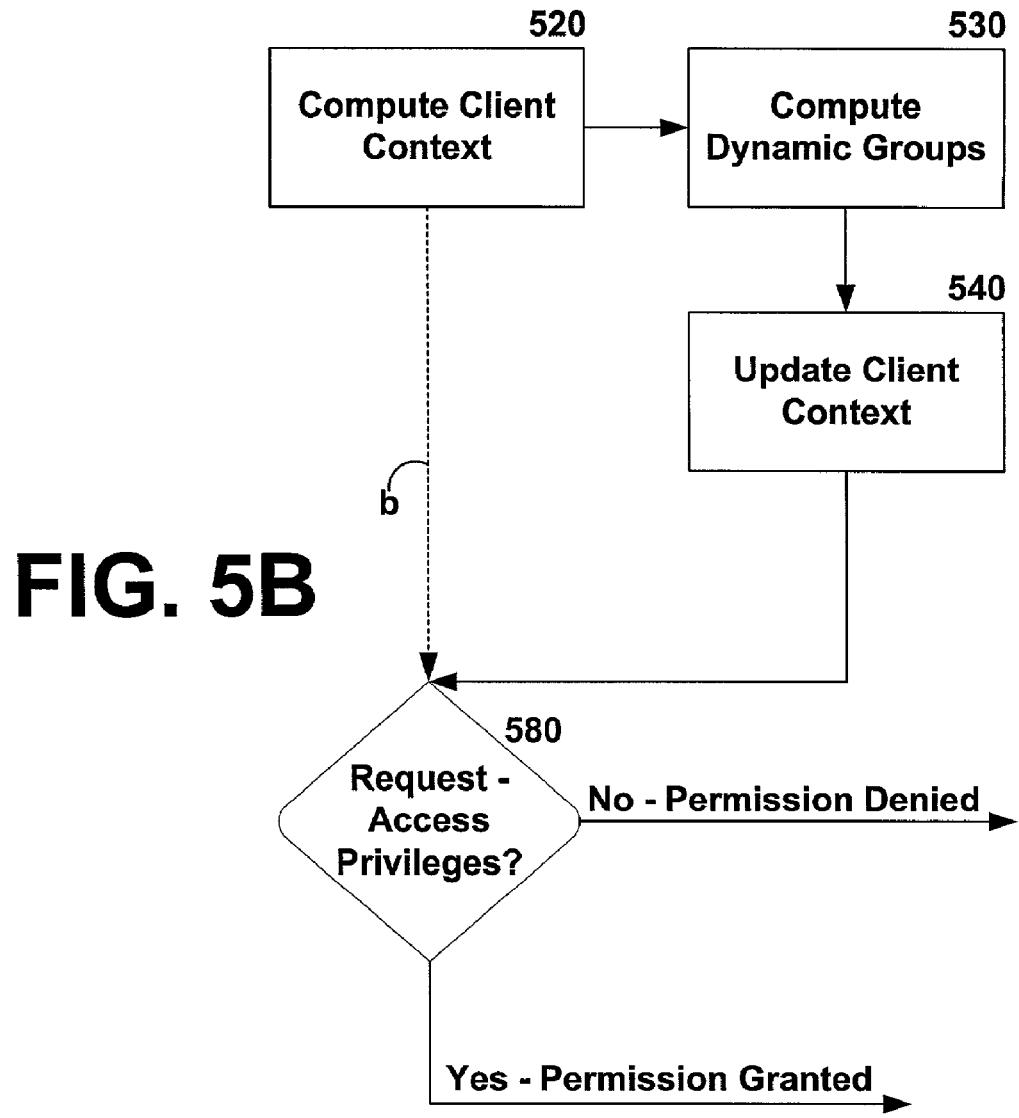
FIG. 5B is a flow diagram illustrating an exemplary sequence of events in connection with the dynamic computation of a client authorization context in accordance with the present invention.

FIGS. 5A through 5C illustrate exemplary interaction between an application and authorization framework using the dynamic authorization callback mechanism. At application start up, at 500, the application initializes a resource manager 410 and at 510, registers with the resource manager 410 the ComputeDynamicGroups 414 and DynamicAccessCheck 416 callback functions using an initialization routine. These callback functions are added to the resource manager's registered callback list 412. Next, at 515, when a client request for an object or property is received, at 520, the application initializes a client context 420 for that client using one or more of the client context initialization routines. If the application possesses information such as system data, environment data, additional client attributes or client parameter values passed in from client operation that must be evaluated to determine whether the client should be made a member of dynamic groups, the application passes this information into the utilized client context initialization routine(s).

Within the client context initialization routine(s) performed at 520, the resource manager 410 first populates the client context 420 with the user identifier 422 and group identifier 424 associated with the system-level client context passed into the routine. Then, at 530, the resource manager 410 invokes the ComputeDynamicGroups callback function 414, if present, passing the relevant dynamic data of the client context initialization routine(s) into one or more argument parameters.

Within the application code that implements ComputeDynamicGroups 414, the application evaluates the client context 420, its argument parameter(s), and any flexible authorization policy defined in code or a separate store. Based on this evaluation, the application may identify, and return, one or more dynamic groups such as Manager_sid 426 to which the client should be assigned. At 540, these dynamic groups are then added to the list of user and group identifiers in the client context 420.

The process from 520 to 540 is illustrated generally in FIG. 5B, in relation to the flow of a conventional static model as depicted by the dashed line b. After a new client makes a request for an object or property, the client context initialization routines are called at 520, as in the conventional case. Once computed, the process would proceed to waiting for and evaluating the propriety of a request for access privileges at 580. However, in accordance with the present invention, from within this procedure, ComputeDynamicGroups 414 is called at 530 to determine if group membership for the client context is to be changed based upon dynamic data. If so, then group membership for the client context is updated in accordance with the run-time computation at 540. Thus, through the vehicle of ComputeDynamicGroups 414, the client context may be defined in terms of dynamic policy and data.

Referring back to FIG. 5A, after the dynamic computation of the client context 420 at 520 through 540, for an access check in accordance with the present invention, at 550, the application 500 calls a standard access check routine, with fuctionality of the present invention incorporated therein, to determine if the caller or client represented by the input client context 420 is allowed access to the object or property protected by the DACL. This embodiment of an access check routine exemplifies the modification of a pre-existing routine (access check) to include the dynamic capabilities of the present invention. In this regard, if dynamic data, such as runtime or operational data, is required for the access check, the application passes this data into optional argument(s) of an access check data structure which is in turn passed into the access check routine. If the DACL contains a callback ACE with a principal identifier that matches an identifier in the client context 420, then the application-defined DynamicAccessCheck callback function 416, if present, is invoked at 550 with inputs including the client context 420, the optional argument(s) passed into the access check routine, and the matching callback ACE, which may itself contain some authorization policy data meaningful only to the application.

To evaluate the callback ACE encountered, within the application code that implements DynamicAccessCheck 416, the application evaluates the client context 420, the optional argument(s) if present, and the optional policy data that may be present in the callback ACE. The application may also use a GetContextinformation API to retrieve additional information, e.g., security IDs, from the client context. If the application determines from the input runtime arguments, the policy data in the ACE, the client context 420, and any policy or dynamic data it may manage in some other fashion, that the caller or client in this context 420 constitutes a match with the callback ACE, then the DynamicAccessCheck routine 416 returns a Boolean result indicating whether the permissions present in the ACE are accounted for or incorporated in the access decision. When the DACL evaluation is complete, perhaps after one or more invocations of the DynamicAccessCheck function 416, at 570, the standard access check function outputs the result. In one embodiment, a list or set of permissions is returned corresponding to the user's authorizations.

The process from 545 to 575 is illustrated generally in FIG. 5C, in relation to the flow of a conventional static model as depicted by the dashed line c. After a request is made for access to an object or property from a client at 545, an access check routine is called, as in the conventional case. In the conventional case, once the access check routine is called, the process proceeds to an evaluation of static data against static policy at 550, and as shown by dashed line c, the result is then output at 575. However, in accordance with the present invention, from within the access check routine, for each callback ACE encountered in the DACL, DynamicAccessCheck 416 is called at 560 to determine based upon dynamic data and policy whether there is an impact on the permission set being evaluated. Any impact is returned to the access check routine at 570 to complete the access evaluation procedure. Once completed, the result of the access check is output at 575. Thus, through the vehicle of DynamicAccessCheck 414, access policy may be defined and assessed in terms of dynamic policy and data.

Figure 6:
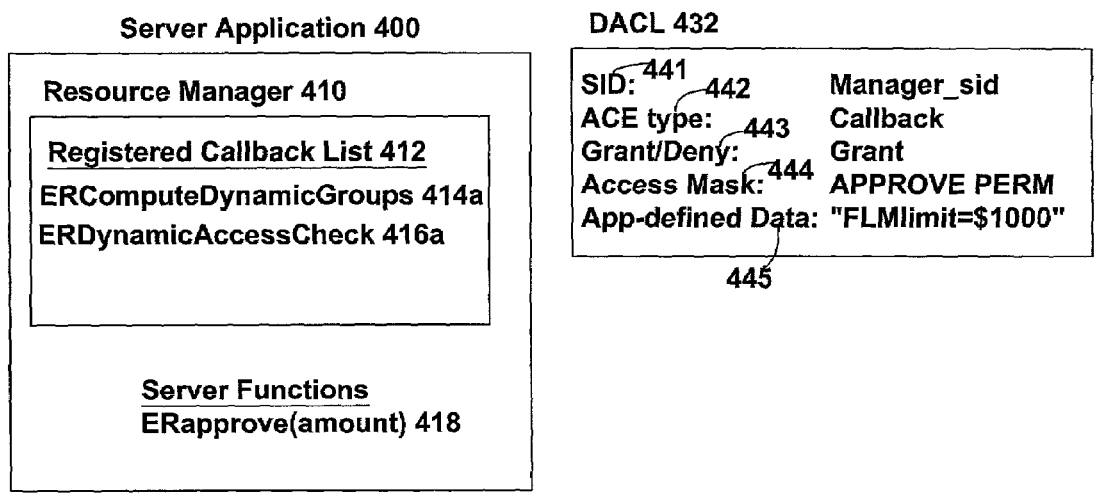
FIG. 6 is a block diagram illustrating an exemplary state of the resource manager and other system objects during a client context initialization for an expense report application in accordance with the present invention.
Figure 7:
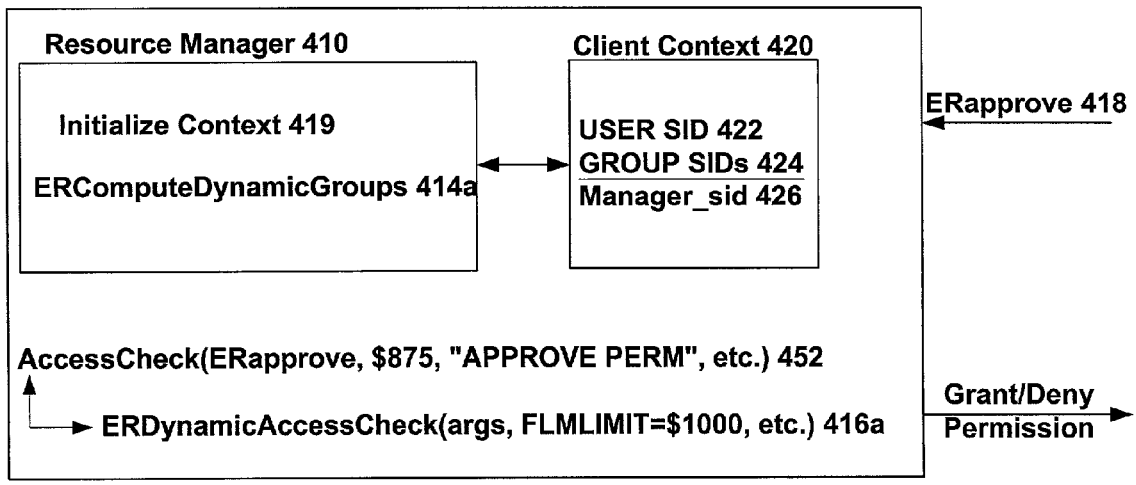
FIG. 7 is a block diagram illustrating an exemplary state of the resource manager and other objects during a dynamic access check computed for an expense report application in accordance with the present invention.

FIGS. 6 and 7 are diagrams illustrating the dynamic authorization callback mechanism of the present invention using the example of an expense report application. FIG. 6 is an exemplary resource manager initialization diagram illustrating a DACL embodying conventional static authorization policy including data such as a SID (Security Identifier) 441, ACE type 442, a grant/deny condition 443, an access mask 444 for an access mask array, and application-defined data 445, the application-defined run-time authorization logic in registered callback functions ERComputeDynamicGroups 414a and ERDynamicAccessCheck 416a and generally the resource manager initialization process:

An expense report application 400, having a resource manager 410, e.g., an expense report server, that implements an operation called ERapprove, which allows an authorized caller to approve an expense report providing the amount of the expense report is within a certain limit and provided the person is a manager. The DACL, created and maintained by the Expense Report Server 410, has a callback ACL entry (ACE) holding the information shown in 441 through 445 and described above.

Upon initialization of the resource manager 410, the application calls a resource manager initialization routine, which instantiates the resource manager 410 with two registered callbacks in the registered callback list 412: ERComputeDynamicGroups 414a and ERDynamicAccessCheck 416a.

The ERComputeDynamicGroups callback function 414a implements the logic that adds an application defined security identifier, e.g., Manager_sid, to a caller's client context 420 if the application determines dynamically that the caller is a manager.

The ERDynamicAccessCheck callback function 416a implements the logic that evaluates application provided information i.e., a function/operation name such as ERapprove 418 and an operation parameter such as amount, during an access check call to determine if the caller is approved to execute the operation with the given parameter e.g., Erapprove 418 with paramater amount.

FIG. 7 is a diagram illustrating a client connect and subsequent process of performing an access check using the dynamic authorization callback mechanism of the present invention for a client operation in connection with the expense report server example.

First, a client calls ERapprove operation 418 to request approval of an expense report with an amount equal to $875. Upon receiving the client call, the resource manager calls a client context initialization routine 419 to create a client context 420 containing user and group SIDs either extracted from a system authorization context or retrieved from a user information store, based on a SID asserted by the application on behalf of the client.

Next, client context initialization routine 419 invokes the ERComputeDynamicGroups callback function 414a registered with the resource manager 410. For instance, if the code of ERComputeDynamicGroups 414a contains a statement, here expressed as pseudocode, such as {If client is Manager, then add Manager_sid to client context}, then as a result, Manager_sid is added to the client context 420 if the client is determined by any means to be a Manager. Since this example assumes a successful test of that condition, Manager_sid is added to the client context 420 by the context initialization function 419. The ERComputeDynamicGroups callback function 414a may make decisions based on optional data and/or the client authorization context.

The resource manager 410 calls the access check function 452, passing in as optional parameters in an access request structure tailored to the invention, the client operation associated data such as function=ERapprove 418 and amount=$875. Resource manager 410 also passes in the permission, in this case approve, required to perform the operation, the client context 420, the DACL 432 containing the callback ACE illustrated in FIG. 6. During the evaluation of the DACL, the access check routine 452 finds that the Manager_sid in the client context 420 matches the SID 441 in the callback ACE; thus it invokes the ERDynamicAccessCheck callback function 416a, passing in the optional parameters, as described above.

The ERDynamicAccessCheck callback 416a determines from the application defined data in the callback ACE as illustrated in FIG. 6, that the expense report approval amount 445 for Managers is $1000. In conjunction with ERDynamicAccessCheck callback 416a, it is known that the expense report approval authorization policy is to grant permission 443 to perform the ERapprove operation 418 if the requested "amount" is less than the FLMlimit. As pseudocode, for example, ERDynamicAccessCheck callback 416a might have a statement such as {If function is Erapprove, then if amount is less than FLMlimit, return true, otherwise false.}

In this example, the amount, $875 is under the limit, thus the ERDynamicAccessCheck function 416a returns a match indicating the client matches the conditions of the callback ACE and should be granted the permissions, in this case "approve" permission, in the access mask 444 of the callback ACE.

The access check routine, at 452, finds that the required permission, "approve," was granted by the DACL, and thus it returns a list of permissions and the resource manager 410 completes ERapprove operation 418 processing.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various Figures, it is to be understood that other similar embodiments may be used or modifications and additions may be made to the described embodiment for performing the same function of the present invention without deviating therefrom. For example, while exemplary embodiments of the invention are described in the context of a machine with an application utilizing the present invention layered upon or incorporated into conventional APIs for implementing dynamic and static authorization policies, the invention may be applied to any network with any number of machines in connection with which it is desirable to grant or deny access decisions predicated upon run-time conditions. Also, while exemplary embodiments have been described in the context of SIDs, the present invention may utilize any kind of identifier for purposes of an access privilege check. Further, one skilled in the art will recognize that the present invention is not limited to expense report servers or systems using a directory service, such as an Active Directory™ service, as a data store, as described in exemplary embodiments above, but rather the present invention relates to any application in any system in which access control decisions may be made dynamically based upon data wherever stored. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for dynamically managing access to a resource in a computer system, the system having a client thereof requesting access to the resource from an application, the method comprising:

initializing a client authorization context for the client using one or more client context initialization routines;

determining, via an application programming interface, based upon dynamic data possessed by the application and a first dynamic policy whether said client authorization context is to be updated and, if so, updating said client authorization context, wherein said first dynamic policy is tailored to said application through which the resource is accessed;

invoking an access check routine to determine if the client represented by the client authorization context is allowed access to the resource, the application providing said dynamic data and an identifier in the client authorization context to the access check routine for comparison against access control entries;

identifying an access control entry as a callback access control entry; and in response to identifying the access control entry as a callback access control entry and a match between said identifier and an identifier in the callback access control entry, automatically invoking, via said application programming interface, an application-defined dynamic access check routine that performs the access check for the client based upon said dynamic data and a second dynamic policy in the callback access control entry for the application, wherein said second dynamic policy is tailored to said application and said dynamic data includes run-time data managed by the application.

2. A method according to claim 1, wherein said first dynamic policy defines flexible rules for determining the client authorization context and wherein said second dynamic policy defines flexible rules for purposes of determining access privileges.

3. A method according to claim 1, further comprising computing the client authorization context after a request for a resource is received from the client and updating said client authorization context according to said determining.

4. A method according to claim 1, further comprising:
comparing the client authorization context of the client to at least one access control entry of an access control list.

5. A method according to claim 1, further comprising registering with a resource manager, an application-defined routine for determining dynamic groups.

6. A method according to claim 1, further comprising registering with a resource manager, an application-defined routine for determining dynamic access checks.

7. A method according to claim 1, wherein said application-defined dynamic access check routine supplements a determination of access rights based upon static data and policy.

8. A computer readable storage medium having computer executable instructions stored thereon that when executed by a computer cause the computer to carry out a method for dynamically updating a client authorization context in a computer system having a client thereof requesting access to a resource from an application, the method comprising:

computing a client authorization context after the request for the resource is received from the client;

determining, via an application programming interface, based upon dynamic data possessed by the application and a first dynamic policy whether said client authorization context is to be updated and, if so, updating said client authorization context, wherein said first dynamic policy is tailored to said application through which the resource is accessed;

invoking an access check routine to determine if the client represented by the client authorization context is allowed access to the resource, the application providing said dynamic data and an identifier in the client authorization context to the access check routine for comparison against access control entries;

identifying an access control entry as a callback access control entry; and in response to identifying the access control entry as a callback access control entry and a match between said identifier and an identifier in the callback access control entry, automatically invoking, via said application programming interface, an application-defined dynamic access check routine that performs the access check for the client based upon said dynamic data and a second dynamic policy in the callback access control entry for the application, wherein said second dynamic policy is tailored to said application and said dynamic data includes run-time data managed by the application.

9. A computer readable storage medium according to claim 8, the method further comprising:
comparing the client authorization context to at least one access control entry of an access control list.

10. A computer readable storage medium according to claim 8, the method further comprising registering with a resource manager, an application-defined routine for determining dynamic groups.

11. A computer readable storage medium according to claim 8, the method further comprising registering with a resource manager, an application-defined routine for determining dynamic access checks.

12. A computer readable storage medium according to claim 8, the method further comprising comparing data to a client authorization context determined based upon static data and policy before said step of determining based upon dynamic data whether the client authorization context is to be updated.

13. A computer readable storage medium according to claim 8, wherein said application-defined dynamic access check routine supplements a determination of access rights based upon static data and policy.

14. A computer readable storage medium having computer executable instructions stored thereon that when executed by a computer cause the computer to perform a method of dynamically managing access to a resource in a computer system, the system having a client thereof requesting access to the resource from an application, the method comprising:

computing a client authorization context after the access request for the resource is received from the client;

determining, via an application programming interface, based upon dynamic data possessed by the application and a first dynamic policy whether said client authorization context is to be updated and, if so, updating said client authorization context, wherein said first dynamic policy is tailored to said application through which the resource is accessed;

providing said dynamic data and the client authorization context to an access check routine;

comparing the client authorization context to at least one access control entry of an access control list to determine if the client represented by the client authorization context is allowed access to the resource;

identifying an access control entry having an identifier that matches an identifier in the client authorization context as a callback access control entry; and in response to identifying the access control entry as a callback access control entry, automatically invoking, via said application programming interface, an application-defined dynamic access check routine that performs the access check for the client based upon said dynamic data and a second dynamic policy in the callback access control entry for the application, wherein said second dynamic policy is tailored to said application and said dynamic data includes run-time data managed by the application.

15. A computer readable storage medium according to claim 14, wherein said access check routine is invoked automatically when there is a match between an identifier in the client authorization context and an identifier in the callback access control entry.

16. A computer readable storage medium according to claim 14, wherein said application-defined dynamic access check routine supplements a determination of access rights based upon static data and policy.

17. For an application in a computer system having a resource manager that manages and controls access to a resource and a client thereof requesting access to a resource from an application, a computer readable storage medium having computer executable instructions stored thereon that when executed by the computer system causes the computer system to carry out a method for carrying out a dynamic authorization callback mechanism that provides extensible support for application-defined business rules via a set of APIs and DACLs including a dynamic groups routine and a dynamic access routine customized to the application, the method comprising:

initializing a client authorization context for the client;
   carrying out said dynamic groups routine to update said client authorization context based upon dynamic data possessed by the application and a first dynamic policy tailored to said application through which the resource is accessed; and
   carrying out said dynamic access routine to determine if the client represented by the updated client authorization context is allowed access to the resource, said dynamic access routine using said dynamic data and a second dynamic policy in a callback access control entry when an identifier in the client authorization context matches an identifier in the callback access control entry, wherein said dynamic data includes run-time data managed by the application.

18. A computer readable storage medium according to claim 17, further comprising registering said dynamic groups routine and said dynamic access routine with the resource manager upon initializing the resource manager and storing said second dynamic policy in said callback access control entry.

19. A computer readable storage medium having computer executable instructions stored thereon that when executed by a computer causes the computer to provide dynamic authorization of an application in a computer system based upon application-specific or business rules that incorporate dynamic data, the dynamic data including an identifier for identifying whether a dynamic access check callback function should be invoked for conducting said dynamic authorization of said application, data from client operation parameters, authorization policy data stored in a callback access control entry, and any other authorization policy data managed, computed or retrieved by the application, the computer executing said computer executable instructions to perform the steps of:

the application using an initialization routine to register with a resource manager dynamic group functions that enable the application to assign temporary group membership based upon said dynamic data to a client for the purpose of checking access rights to a resource protected by the resource manager and to register with said resource manager dynamic access check callback functions that enable the application to perform customized procedures for checking access rights to said resource based on said dynamic data;
   adding said dynamic access check callback functions to the resource manager's registered callback list;
   when a user attempts to connect to the application to request the resource, automatically invoking a registered dynamic group function to augment said client authorization context with client contextual data computed using said dynamic data; and
   invoking a registered dynamic access check callback function to provide said customized procedures for checking access rights to the resource based on said dynamic data and said augmented client authorization context.

20. A computer readable storage medium according to claim 19, wherein a user's security identifier is used for an access privilege check of said application.

* * * * *